United States Patent
Khanka et al.

(10) Patent No.: US 7,978,626 B1
(45) Date of Patent: Jul. 12, 2011

(54) METHOD AND SYSTEM FOR ADAPTIVE HYBRID AUTOMATIC REPEAT REQUEST PROTOCOLS BASED ON NETWORK CONDITIONS

(75) Inventors: Bhagwan Khanka, Lenexa, KS (US); Manoj Shetty, Overland Park, KS (US); Siddharth S. Oroskar, Overland Park, KS (US); Jasinder P. Singh, Olathe, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 200 days.

(21) Appl. No.: 12/352,952

(22) Filed: Jan. 13, 2009

(51) Int. Cl.
*H04J 1/16* (2006.01)

(52) U.S. Cl. ......... 370/252; 370/230; 370/474; 714/748

(58) Field of Classification Search .................. 370/230, 370/231, 252, 253, 260, 352, 328, 389, 394, 370/473, 474, 458, 491, 342, 441, 349, 355, 370/419, 216; 714/748, 750, 751, 755; 455/522, 455/452.1, 509, 450, 420
See application file for complete search history.

(56) References Cited

U.S. PATENT DOCUMENTS

| | | | |
|---|---|---|---|
| 6,308,294 | B1 | 10/2001 | Ghosh et al. |
| 6,631,127 | B1 | 10/2003 | Ahmed et al. |
| 6,697,987 | B2 | 2/2004 | Lee et al. |
| 6,925,132 | B2 | 8/2005 | Song et al. |
| 7,002,993 | B1 | 2/2006 | Mohaban et al. |
| 7,136,929 | B2 * | 11/2006 | Koprivica ...................... 709/232 |
| 7,206,280 | B1 * | 4/2007 | Khan et al. ..................... 370/216 |
| 7,388,919 | B2 | 6/2008 | Varma et al. |
| 7,447,968 | B2 * | 11/2008 | Ha et al. ......................... 714/748 |
| 7,715,347 | B2 * | 5/2010 | Yoon et al. ..................... 370/332 |
| 2004/0141525 | A1 * | 7/2004 | Bhushan et al. ............. 370/473 |
| 2004/0179475 | A1 | 9/2004 | Hwang et al. |
| 2006/0013216 | A1 * | 1/2006 | Rajkotia et al. ............... 370/389 |
| 2006/0109810 | A1 * | 5/2006 | Au et al. ........................ 370/328 |

(Continued)

FOREIGN PATENT DOCUMENTS

WO  WO 2007059523  5/2007

OTHER PUBLICATIONS

IEEE 802.16 Broadband Wireless Access Working Group <http://ieee802.org/16>, Aggregated H-ARQ, Lim Geunhwi, et al., Nov. 4, 2004.

*Primary Examiner* — Aung S Moe
*Assistant Examiner* — Abdullah Riyami

(57) ABSTRACT

Methods and systems for adaptive hybrid automatic repeat request (H-ARQ) protocols are disclosed. The protocols preferably adapt to changing network conditions between a client node and an access node by omitting the transmission of certain messages when network conditions are determined to be favorable. In doing so, packets are processed faster, thus reducing communication latency as well as the memory requirements of the protocols. One scenario in which the protocols may operate is where the client node is a wireless communication device coupled to the access node via a wireless network. In such a scenario, the access node may, from time to time, measure a quality of the wireless air interface between the client node and the access node, and determine whether to transmit an acknowledgement message based on the outcome of the measurement as compared to a threshold value.

21 Claims, 8 Drawing Sheets

U.S. PATENT DOCUMENTS

| | | | |
|---|---|---|---|
| 2007/0070952 A1* | 3/2007 | Yoon et al. | 370/334 |
| 2007/0091816 A1* | 4/2007 | Lee et al. | 370/252 |
| 2007/0110095 A1* | 5/2007 | Attar et al. | 370/458 |
| 2007/0168822 A1 | 7/2007 | Vitebsky et al. | |
| 2007/0214400 A1 | 9/2007 | Smith et al. | |
| 2007/0300120 A1* | 12/2007 | Kim et al. | 714/749 |
| 2008/0130643 A1* | 6/2008 | Jain et al. | 370/389 |
| 2008/0168321 A1* | 7/2008 | Lim et al. | 714/748 |
| 2008/0194284 A1* | 8/2008 | Choi et al. | 455/522 |
| 2009/0016265 A1* | 1/2009 | Katayama et al. | 370/328 |
| 2009/0129276 A1* | 5/2009 | Dendy | 370/236 |
| 2009/0319854 A1* | 12/2009 | Qian et al. | 714/750 |
| 2009/0327443 A1* | 12/2009 | Pawar et al. | 709/207 |
| 2010/0091735 A1* | 4/2010 | Kim et al. | 370/331 |
| 2010/0135156 A1* | 6/2010 | Sarkar | 370/230 |

\* cited by examiner

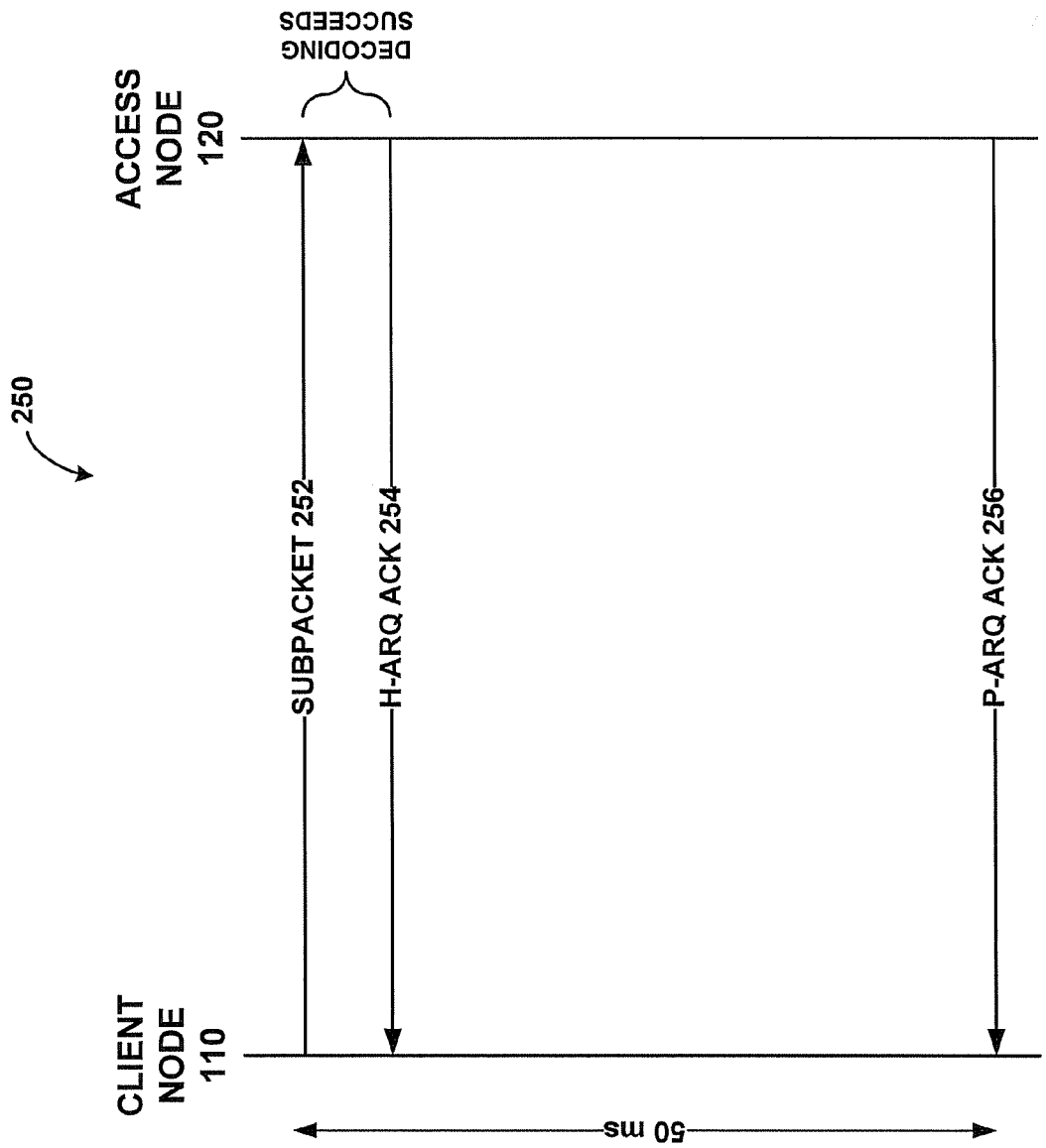

METHOD AND SYSTEM FOR ADAPTIVE HYBRID AUTOMATIC REPEAT REQUEST PROTOCOLS BASED ON NETWORK CONDITIONS

BACKGROUND

In a communication system, an access node may comprise a device or set of devices that serve as a gateway to a network. Client nodes may use an access node to exchange information with other nodes, gateways or devices communicatively coupled to the network. This information may take the form of voice, data, or some other media. The client nodes may be wireline or wireless components.

Communication systems in general, and wireless networks in particular, are subject to impairments that can lead to packet corruption and packet loss. For instance a wireless signal can suffer from various types of attenuation, reflections, and interference. In order to address these problems and reduce the effective packet loss rate of a channel, forward error correction (FEC) schemes may be used.

One particularly effective method of implementing FEC is through the use of hybrid automatic repeat request (ARQ). In a communication system using hybrid ARQ, a client node transmits one or more subpackets containing copies of part or all of a packet. Each subpacket may also contain an extent of FEC coding. An access node transmits a negative acknowledgment (NACK) for each sub-packet it receives until the access node can properly decode the original packet from the series of sub-packets. Once the access node successfully decodes the original packet, it transmits an acknowledgment (ACK) to the client node. Preferably, a client node will attempt to transmit only a limited number of subpackets per packet before giving up on the transmission of the packet.

At a fixed time after the access node receives the first subpacket, the access node transmits a final ARQ message to the client node. This final ARQ message either ACKs or NACKs the entire packet. If a subpacket of the packet has been ACKed, the final ARQ message will be an ACK. If none of the subpackets of the packet were ACKed, the final ARQ message will be a NACK.

If the access node transmits a final ARQ ACK message, the access node passes the received and decoded packet to a higher layer protocol, such as a network layer protocol, for further processing. Additionally, upon receiving a final ARQ ACK message, the client node preferably removes a copy of the packet from its transmit buffer, thus freeing client node memory.

Communication systems with lossy channels, such as wireless networks, may benefit significantly from hybrid ARQ. The use of hybrid ARQ may be able to reduce packet error rates of 10% or more to a negligible level. However, the channel characteristics of wireless networks may fluctuate, with bit error rates and frame error rates changing from time to time. When the network conditions are poor, some or all subpackets may be garbled or lost in transit between the client node and access node. In such a situation, it is useful to have the final ARQ message confirm the status of the packet.

However, when the network conditions are favorable, the majority of subpackets transmitted from the client node to the access node will be successfully received. Thus, given that the final ARQ message is transmitted at a fixed time interval after the first subpacket is transmitted, the access node may have to wait an unnecessarily long period of time before passing the packet to a high layer protocol. For latency-sensitive applications, such as voice over Internet Protocol (VOIP), push to talk (PTT), and interacting gaming, this addition of a few milliseconds or a few tens of milliseconds of packet delay can have a deleterious impact on end-to-end application performance. Moreover, the client node is required to maintain a copy of the packet in a buffer while it is waiting to receive the final ARQ message, thus wasting memory resources. Furthermore, when the access node transmits a final ARQ message, valuable and scarce network resources may be used.

OVERVIEW

In order to reduce packet delay, memory utilization in both client nodes and access nodes, and network utilization, it is desirable to eliminate the transmission of final ARQ messages when network conditions are favorable. Accordingly, methods and systems are presented to modify hybrid ARQ schemes so that the final ARQ message is transmitted only when network conditions are poor.

In a preferred embodiment, hybrid ARQ is performed between a client node and an access node. The access node maintains a threshold value representative of network conditions between the client node and access node. When observed network conditions fall on one side of that represented by the threshold value, the access node transmits a final ARQ message to the client node for each packet transmitted by the client node. However, when observed network conditions fall on the other side of that represented by the threshold value, the access node refrains from transmitting a final ARQ message for each packet transmitted by the client node, and instead processes each packet it receives and successfully decodes without further delay.

The network conditions may be measured at the access node or at the client node, and an aggregate measurement may be based on a weighted average of several such measurements. For example, the network conditions may be based on a bit error rate or a packet error rate measured at the access node. Alternatively, the measurements may be based on the number of subpackets per packet transmitted by the client node.

Furthermore, whether the access node transmits final ARQ messages may be referred to as the mode of the access node. Thus, the access node may operate according to a first mode in which it transmits final ARQ messages, and the access node may also operate according to a second mode in which it does not transmit final ARQ messages. The access node may switch between the first and second modes based on a comparison of measured network conditions to the threshold value. When the access node switches between modes it may transmit an indication of the mode change to the client node so that the client node knows when to expect a final ARQ message.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIGS. 2A and 2B depict exemplary operations of a hybrid ARQ protocol in accordance with a preferred embodiment;

DESCRIPTION

In accordance with exemplary embodiments, methods and systems for adapting hybrid ARQ protocols based on network conditions are presented. Preferably, an access node engages in hybrid ARQ protocols with one or more client nodes. Based on a comparison of one or more measured network condition(s) with a threshold value, the access node may change the behavior of the hybrid ARQ protocols so that the hybrid ARQ protocols perform more efficiently under the measured network condition(s).

I. System Architecture

Figure 1:
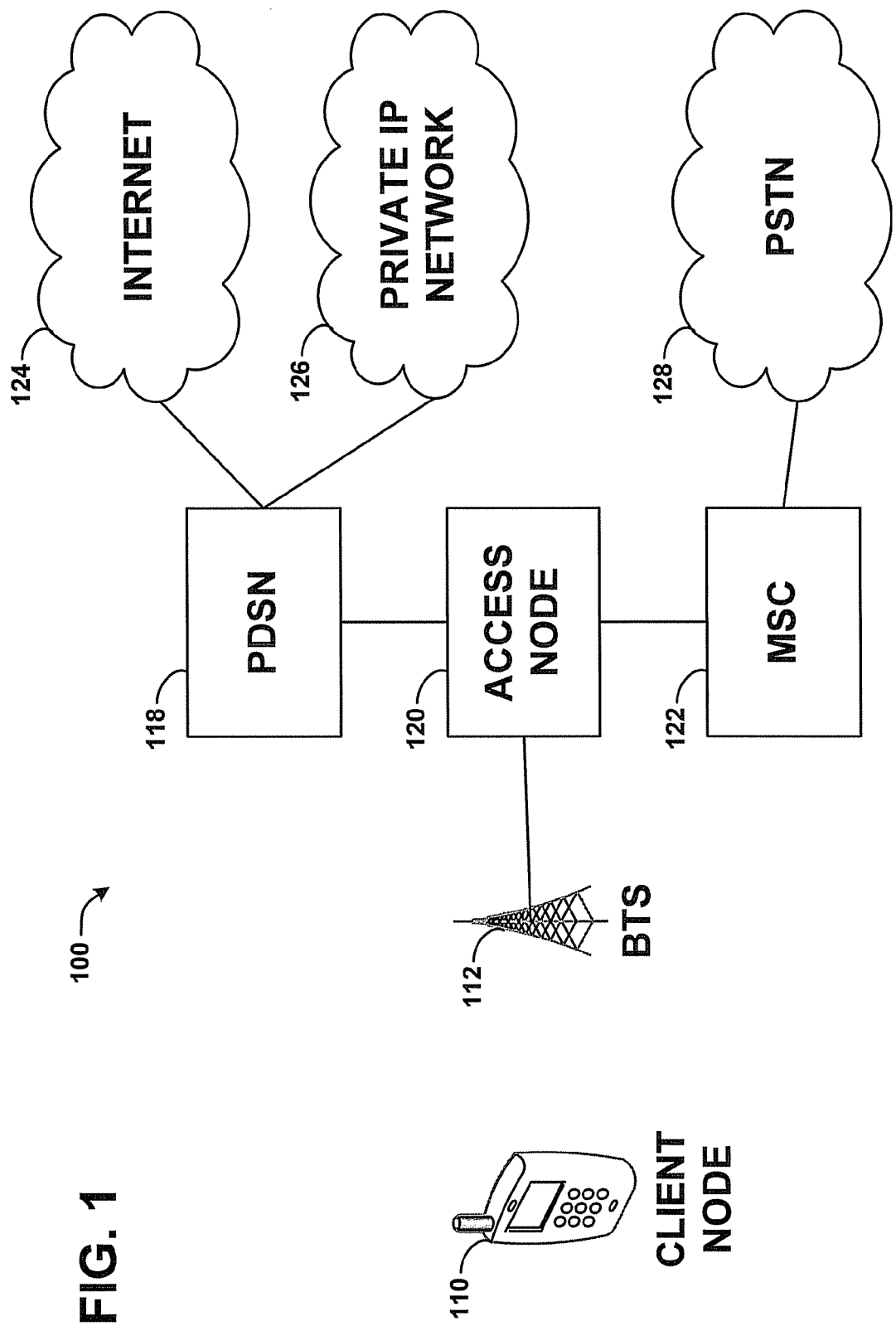
FIG. 1 depicts a network architecture in accordance with a preferred embodiment.

FIG. 1 is a simplified block diagram of an exemplary communication network 100, in which exemplary embodiments may be employed. Network 100 includes base transceiver station (BTS) 112 that can communicate with a client node 110 via a plurality of wireless coverage areas. Client node 110 could be a wireless telephone, wireless personal digital assistant, wirelessly equipped laptop computer, wireless router, or other type of mobile or fixed wireless device.

BTS 112 radiates to define the wireless coverage areas. Each wireless coverage area provides air interface access to client node 110 and any other client nodes served by the wireless coverage area. A single BTS may define one or more wireless coverage areas. The air interface may include a forward link transmitted from BTS 112 to client node 110 and a reverse link transmitted from client node 110 to BTS 112. Client node 110 exchanges signaling, voice, data, video, or other media with BTS 112 through the forward and reverse links. In this regard, client node 110 may use the wireless coverage areas defined by BTS 112 to communicate with one or more endpoints. These endpoints may include other client nodes, e-mail servers, world wide web servers, gaming servers, media servers, media gateways, and/or location-based services, via a packet-switched network (e.g., the Internet 124 or private IP network 126), and/or a circuit-switched network, such as the public switched telephone network (PSTN) 128. Alternatively, access node 120 may communicate with PSTN 128 via a media gateway (not shown) that bridges Internet 124 or private IP network 126 to PSTN 128.

As an illustrative example, BTS 112 may be communicatively coupled to access node 120. Access node 120 may comprise a base station controller (BSC), a radio network controller (RNC), and/or a similar type of device. Access node 120 may, in turn, be communicatively coupled to packet-switched networks 124, 126 via a packet data serving node (PDSN) 118. Alternatively or additionally, access node 120 may be communicatively coupled to PSTN 128 via a mobile switching center (MSC) 122. However, MSC 122 may be integrated with or replaced by an IP multimedia subsystem (IMS) infrastructure.

Although FIG. 1 shows only one BTS, network 100 may include more than one BTS. Each BTS may be communicatively coupled to access node 120 or to other network elements that are communicatively coupled to packet-switched networks 124, 126 and/or PSTN 128. Furthermore, client node 110 may be able to transfer ongoing communication sessions from one BTS to another in a handoff process. Network 100 may also include multiple access nodes, PDSNs, and MSCs.

The combination of network elements including BTS 112, access node 120, PDSN 118, and MSC 122 may be collectively referred to as a radio access network (RAN). However, a RAN may also be defined to comprise more or fewer elements. For example, a RAN may comprise a single BTS and/or a single access node. Furthermore, these elements may be combined with one another; for example, some combination of a BTS, an access node, a PDSN, and an MSC may be physically co-located or may be components of the same physical element. Regardless of the composition of the RAN, at least one entity within the RAN serves as an access node by acknowledging frames (in a preferred embodiment, frames contain subpackets) transmitted by the client nodes in the RAN's coverage area.

The entity or entities of the RAN preferably include at least one processor, data storage, and program instructions stored in the data storage and executable by the processor to carry out RAN functions described herein. Similarly, a client node preferably includes at least one processor, data storage, and program instructions stored in the data storage and executable by the processor to carry out client node functions described herein. Furthermore, the client nodes and the RAN may operate and communicate with each other in accordance to various types of wireless protocols, such as Code Division Multiple Access (CDMA), Worldwide Interoperability for Microwave Access (WIMAX®), Universal Mobile Telecommunications System (UMTS), Long Term Evolution (LTE®), IEEE 802.11 (WIFI®), or other protocols.

II. Hybrid ARQ in CDMA

CDMA, WIMAX®, and other types of wireless protocols may use hybrid ARQ in order accommodate the lossy nature of wireless channels. However, hybrid ARQ may be used by any type of wireless or wireline protocol, not just the protocols or protocol families discussed herein. According to hybrid ARQ procedures, for each packet a client node seeks to transmit to the access node, the client node will instead transmit between one and N subpackets. Each subpacket contains some combination of data derived from the packet and error correcting codes.

The error correcting codes insert redundant information into a voice or data bit stream so that an access node has a higher probability of being able to properly decode the packet from one or more subpackets. Popular types of error correcting codes include Reed-Solomon codes and turbo codes, and CDMA, WIMAX®, and other wireless systems may use these or other types of error correcting codes.

In hybrid ARQ, a given subpacket may contain only data or only error correcting codes. For instance, if three subpackets are used to transmit a packet from the client node to the access node, the first subpacket may contain a copy of all of the data from the original packet, while the second and third subpackets may contain only error correcting codes.

In typical hybrid ARQ operation, the client node transmits a first subpacket to the access node. The first subpacket may contain data, error correcting codes, or a combination of data and error correcting codes. Upon receiving the first subpacket, the access node attempts to decode the packet from the content of the first subpacket. If the access node is successful in doing so, it transmits an H-ARQ ACK message to the client node, indicating that the packet has been successfully received. In this case, the client node will not transmit any further subpackets of the packet to the access node.

On the other hand, if the access node cannot decode the packet from the first subpacket, the access node transmits an H-ARQ NACK message to the client node, indicating that the access node requires more subpackets derived from the packet before it can successfully decode the packet. Upon receiving an H-ARQ NACK for the first subpacket, the client node will transmit a second subpacket to the access node. The second subpacket may also contain some combination of data and error correcting codes. The client node may use a channel or sub-channel between the client node and access node to indicate the number of each subpacket it transmits to the access node. For example, under CDMA protocols, a CDMA reverse rate indicator channel may be used for this purpose.

The process of the client node transmitting subpackets and the access node responding with an H-ARQ NACK continues until either: (1) the access node responds with an H-ARQ ACK for a subpacket, or, (2) the access node has transmitted an H-ARQ NACK for N subpackets derived from the packet. Here, N is typically a value configured at the access node. For purposes of example, N may take on a value of 1, 4, 10, or some other positive integer.

The Nth subpacket may be referred to as the "last" subpacket, as the client node preferably will not transmit any further subpackets for the packet if the Nth subpacket is NACKed. In the case where the client node may not be aware of the value of N, the access node may inform the client node that the Nth subpacket is the last subpacket. To do so, the access node may use an L-ARQ ACK or L-ARQ NACK message. The access node transmits an L-ARQ ACK message when it successfully decodes the packet from the combination of the N subpackets it received. The access node transmits an L-ARQ NACK message when it fails to decode the packet from the combination of the N subpackets it received.

When the client node receives an L-ARQ NACK, it has the option of either retransmitting the original packet by starting the hybrid ARQ transmission process over again for the packet, or not retransmitting the original packet. The client node is likely to take the former option when it is transmitting data for best-effort services. Best effort services can usually absorb the additional latency of the retransmission without an appreciable impact on performance, however the loss of a packet can significantly disrupt a best effort service. On the other hand, the client node is likely to take the latter option when it is transmitting data for real-time services. Real-time services can usually withstand the loss of a packet without an appreciable impact on performance, but cannot absorb the latency associated with retransmission of a packet.

The hybrid ARQ procedures for a packet complete when the access node transmits a P-ARQ ACK or a P-ARQ NACK message. A P-ARQ ACK message acknowledges the entire packet, while a P-ARQ NACK message negatively acknowledges the entire packet. Typically, an access node is arranged to transmit a P-ARQ message to a client node some fixed offset of time after the access node receives the first subpacket. Thus, even if the packet is successfully decoded from the first subpacket, the access node may wait several milliseconds or several tens of milliseconds, or even longer, to transmit a P-ARQ message acknowledging the packet.

CDMA, WIMAX®, and other types of wireless networks may facilitate hybrid ARQ procedures using three bits transmitted in the forward direction. The bits correspond to an H-ARQ, L-ARQ, and P-ARQ message, respectively, and the value of each bit (either zero or one) determines whether the message is an ACK or a NACK.

Figure 2A:
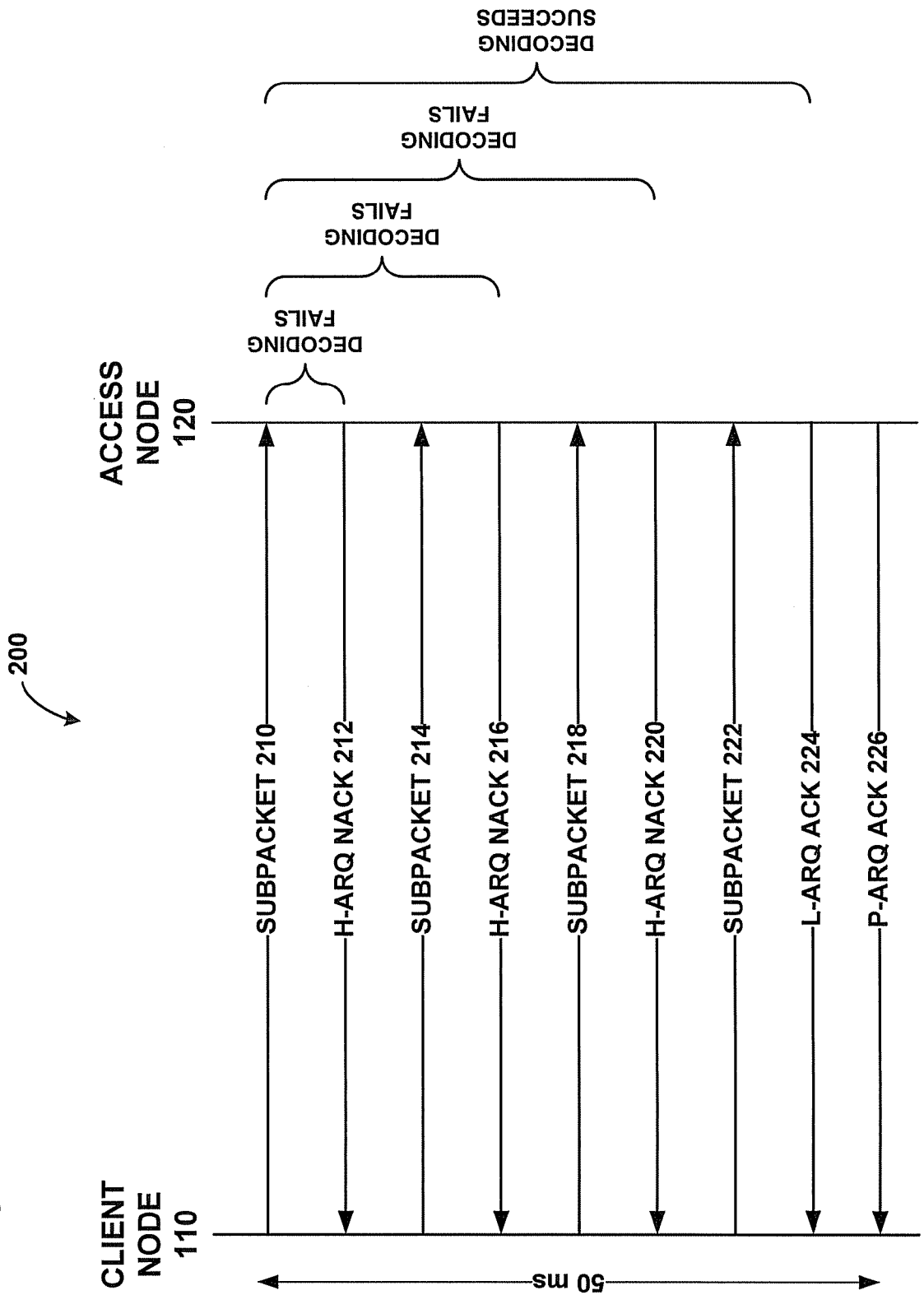

FIG. 2A depicts an example call flow 200 of hybrid ARQ procedures for a single packet, where N is set to 4. Client node 110 first transmits subpacket 210 to access node 120. Access node 120 fails to decode the packet from subpacket 210, so it transmits H-ARQ NACK 212 to client node 110. Client node 110 responsively transmits subpacket 214 to access node 120.

Access node 120 then attempts to decode the packet from the combination of subpacket 210 and subpacket 214. Failing to do so, access node 120 transmits H-ARQ NACK 216 to client node 110.

Once again, client node 110 transmits another subpacket, subpacket 218, to access node 120. Access node 120 attempts, but fails, to decode the packet from the combination of subpacket 210, subpacket 214, and subpacket 218. Accordingly, access node 120 transmits H-ARQ NACK 220 to client node 110. Client node 110 then transmits subpacket 222, the fourth subpacket, to access node 120. This time, access node 120 succeeds in decoding the packet from the combination of subpacket 210, subpacket 214, subpacket 218, and subpacket 222, and therefore transmits L-ARQ ACK 224 to client node 120. Note that access node 120 uses an L-ARQ ACK rather than an H-ARQ ACK for this message because N is set to 4 access node 120 is acknowledging the Nth subpacket.

At this point, access node 120 has successfully received the entire original packet. Accordingly, access node 120 transmits P-ARQ ACK 226 to client node 110, thus acknowledging the receipt of the entire packet. In call flow 200, P-ARQ ACK 226 is transmitted approximately 50 milliseconds after access node 120 receives subpacket 210. This particular delay period is chosen to exemplify CDMA hybrid ARQ procedures, because CDMA can be configured to (a) wait approximately 15 milliseconds between each subsequent subpacket transmission, and (b) transmit a P-ARQ message approximately 5 milliseconds after the Nth subpacket is received. However, other delay periods can be used, and other wireless technologies and protocols may utilize similar delay patterns.

Once access node 120 transmits P-ARQ ACK 226, it can pass the packet up to higher layer protocols, such as a data link layer or network layer protocol, for further processing. Once client node 110 receives P-ARQ ACK 226, it can delete the packet from its transmit buffer. However, when an access node is configured to wait a fixed amount of time from the reception of the first subpacket until it can transmit a P-ARQ message, these actions at access node 120 and client node 110 can be unnecessarily delayed.

FIG. 2B depicts a call flow 250 that exhibits such unnecessary delays. In call flow 250, client node 110 transmits a first subpacket, subpacket 252, to access node 120. Access node 120 successfully decodes the entire original packet form just subpacket 252, and accordingly transmits H-ARQ ACK 254 to client node 110. At this point, the packet can be processed further by access node 120 and access node 120 can transmit a P-ARQ ACK message to client node 110. However, because access node 120 is configured to transmit the P-ARQ ACK message approximately 50 milliseconds after receipt of the first subpacket, access node 120 waits approximately 50 milliseconds before transmitting P-ARQ ACK 256 to client node 110. The packet may not be further processed by access node 120, nor removed from the transmit buffer of client node 110, until this delay period expires.

Since the packet has been successfully received at access node 120, this delay period is unnecessary and can only have a deleterious impact on memory utilization at both client node 110 and access node 120, as well as on the performance of latency-sensitive applications. Thus, it is desirable to eliminate this delay by, when appropriate, removing the requirement of transmitting a P-ARQ ACK from the hybrid ARQ protocol. By eliminating this message from the protocol, network capacity (e.g., wireless channel capacity) is potentially conserved as well.

It should be understood that while the term "acknowledgement" usually refers to positive acknowledgements (ACKs), it also may be applied to negative acknowledgements (NACKs), as both ACKs and NACKs are specific types of acknowledgements.

III. Exemplary Embodiments of Improved Hybrid ARQ

Using hybrid ARQ procedures, an access node may fail to decode a packet from the combination of one or more subpackets that the access node receives from a client node. This failure may occur for various reasons. A subpacket that arrives at the access node may have been distorted or corrupted by network conditions between the client node and access node. For example, some of the subpacket's bits may have been flipped from one to zero or vice versa. Also, a subpacket may be lost between the client node and the access node, or dropped due to buffer overflow at the client node or the access node. Hybrid ARQ operates to accommodate such poor network conditions. When subpackets are likely to be lost or to arrive with errors, hybrid ARQ facilitates the correction of these problems so that the original packet can be successfully decoded from a series of subpackets.

However, when network conditions are reasonably good, fewer subpackets will be lost or arrive with errors. Thus, under good network conditions, it is more likely that a relatively small number of subpacket transmissions will be needed for the access node to decode the original packet. Consequently, when network conditions are good, it is more likely that the access node and client node will suffer an unnecessary delay period before the access node can transmit a P-ARQ ACK message. Accordingly, it would be beneficial for the access node to refrain from transmitting a P-ARQ ACK message when the network conditions are such that it is likely that the access node will need only a relatively small number of subpackets before it can decode the original packet.

Additionally, the access node should resume transmitting P-ARQ ACK messages once the network conditions become such that it is likely the access node will need most or all of the N subpackets before it can decode the original packet. The access node can dynamically adapt to changing network conditions by setting a threshold network condition value, then transmitting P-ARQ ACK messages when observed network conditions fall on one side of this threshold value and are therefore considered "poor," and refraining from transmitting P-ARQ ACK messages when observed network conditions fall on the other side of this threshold value, and are therefore considered "good."

When the access node is transmitting P-ARQ messages and makes a determination to refrain from transmitting P-ARQ messages, or when the access node is refraining from transmitting P-ARQ messages and makes a determination to resume transmitting P-ARQ messages, the access node preferably informs the client node of this determination. For example, the access node may transmit an indication of the determination using a new or existing control channel or control sub-channel between the access node and client node. In CDMA systems, for instance, a P-ARQ "ON/OFF" bit may be added existing control channel messages, such as the QuickConfig and ACACK message. However, there are many ways to accomplish this goal and other methods may be used by CDMA systems or other types of wireless systems.

Network conditions can be measured using a variety of methods. For example, both an access node and a client node can measure the bit error rate (BER) of received messages. If the observed BER falls short of a threshold BER, then the network conditions may be considered "good," but if the BER meets or exceeds the threshold BER, then the network conditions may be considered "poor." Similarly, the access node could alternatively or additionally measure a frame error rate (FER) of received messages. If the observed FER falls short of a threshold FER, then the network conditions may be considered "good," but if the FER meets or exceeds the threshold FER, then the network conditions may be considered "poor."

If the access node measures BER, FER, or another metric indicative of network conditions, it can use the measurement directly to determine whether to transmit a P-ARQ ACK for a given packet. However, if the client node performs the measurement, then the client node may first transmit a representation of the measurement to the access node so that the access node can use the measurement.

Other methods of measuring network conditions can be based on the hybrid ARQ protocol. For example, the number of subpackets received by the access node before the access node can successfully decode the packet is indicative of the network conditions between the client node and access node. Thus, if the access node can decode the packet with relatively few subpackets (e.g., 1 or 2 subpackets when N is set to 4), the network conditions may be considered "good." On the other hand, if the access node needs to receive most or all subpackets before it is able to successfully decode the packet, or if the access node fails to successfully decode the packet after receiving all N subpackets, the network conditions may be considered "poor." Of course, the threshold number of subpackets per packet can be configured anywhere in the spectrum of 1 to N so that the communication system has flexibility in adapting to changing network conditions.

Regardless of the measurement method used to determine network conditions and whether the measurement occurs at the access node or the client node, more than a single measurement may be used to determine network conditions. For instance, a series of several measurements may be taken, and an aggregate representation of this series, such as a moving average, an autoregression, or both, may be used as an observed network condition. Alternatively or additionally, given that network conditions can fluctuate rapidly, a sliding window of only the most recent measurements of network conditions may be used in this calculation.

It should be understood that preferred embodiments are not limited to just these methods of measuring network conditions and different methods of measuring network conditions may be used in addition to or instead of the methods described herein.

Figure 3A:
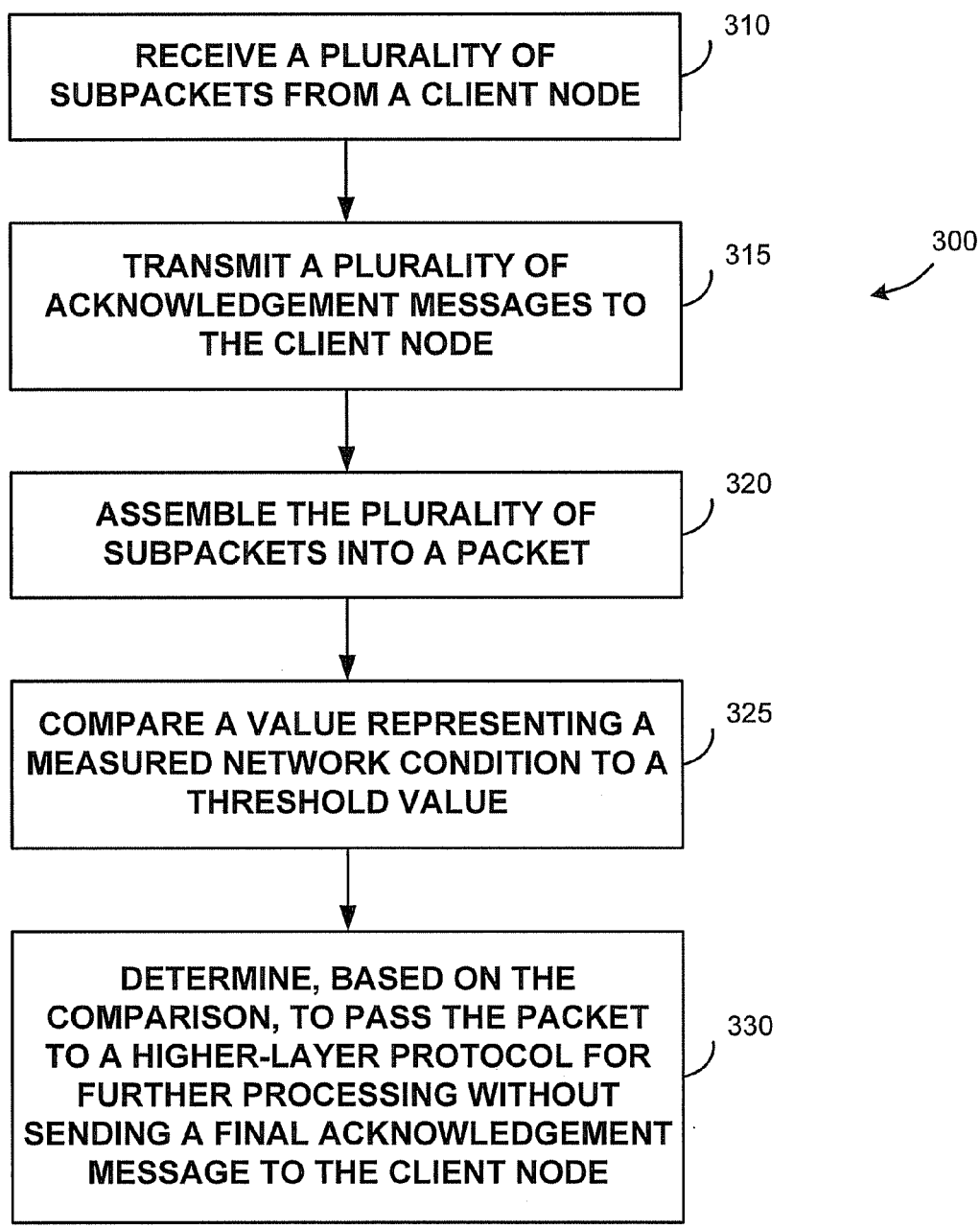
FIGS. 3A, 3B, 3C, and 3D depict methods illustrating adaptive hybrid ARQ behaviors in accordance with preferred embodiments.

FIG. 3A depicts a method 300 for improving hybrid ARQ protocol performance. At step 310, a plurality of subpackets is received from a client node, and at step 315, a plurality of acknowledgement messages are transmitted to the client node. Preferably, each acknowledgment message in the plurality of acknowledgment messages corresponds to a subpacket of the plurality of subpackets in accordance with hybrid ARQ procedures. At step 320, the plurality of subpackets is assembled into a packet.

At step 325, a value representing a measured network condition is compared to a threshold value. The measured network condition may be BER, FER, subpackets per packet, or some other metric. Additionally, the value representing the measured network condition may be based on an aggregation of a series of measurements and/or based on a sliding window of such measurements.

At step 330, a determination is made, based on the outcome of the comparison of step 325, whether to pass the packet to a higher layer protocol for further processing without transmitting a final acknowledgment message to the client node. The final acknowledgment is preferably a P-ARQ ACK message.

Figure 3B:
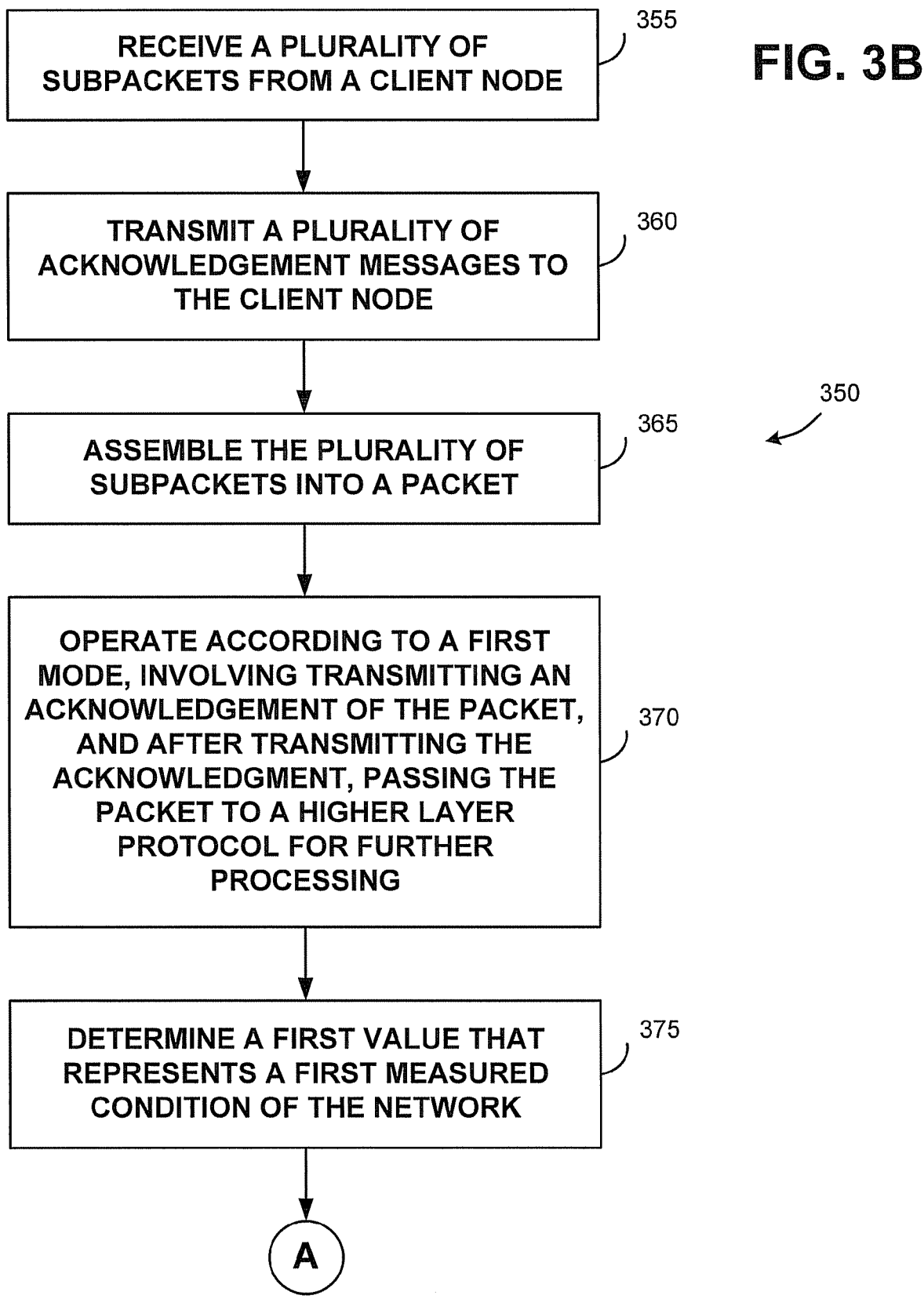

FIG. 3B depicts another method 350 for improving hybrid ARQ protocol performance. At step 355, a plurality of subpackets is received from a client node, and at step 360, a plurality of acknowledgement messages are transmitted to the client node. Preferably, each acknowledgment message in the plurality of acknowledgment messages corresponds to a subpacket of the plurality of subpackets in accordance with hybrid ARQ procedures. At step 365, the plurality of subpackets is assembled into a packet. At step 370, operation according to a first mode occurs, wherein an acknowledgment for the packet is transmitted, and then the packet is passed to a higher layer protocol for further processing. The acknowledgement may be a P-ARQ ACK message.

Figure 3C:
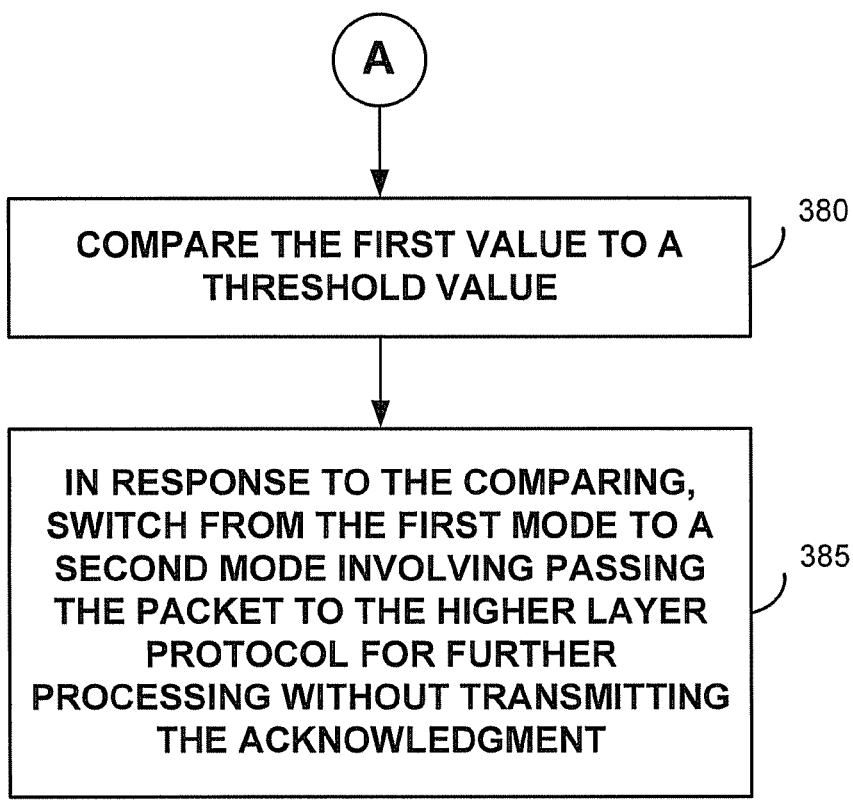

At step 375 a first value representing a first measured condition of the network is determined. Turning to FIG. 3C, at step 380, the first value is compared to a threshold value. Preferably the threshold value represents a pre-determined condition of the network. Similar to the measured conditions of method 300, the first measured condition of the network may be BER, FER, subpackets per packet, or some other metric. Additionally, the first value representing the measured network condition may be based on an aggregation of a series of measurements and/or based on a sliding window of such measurements. At step 385, in response to the comparing, access node operation is switched to occur according to a second mode, wherein the packet is passed to a higher layer protocol for further processing without first transmitting the acknowledgement.

Subsequent to step 385, operation may be switched from the second mode back to the first mode. For instance, a second value representing a second measured condition of the network may be determined. The second value may be compared to the threshold value, and in response to the comparing, access node operation is switched from the second mode to the first mode.

In both method 300 and method 350, the client node may be a wireless communication device using an air interface for communication with an access node, and the measured network condition may be based on a quality of the air interface. Furthermore, in both of these methods, the threshold value may be configurable.

Figure 3D:
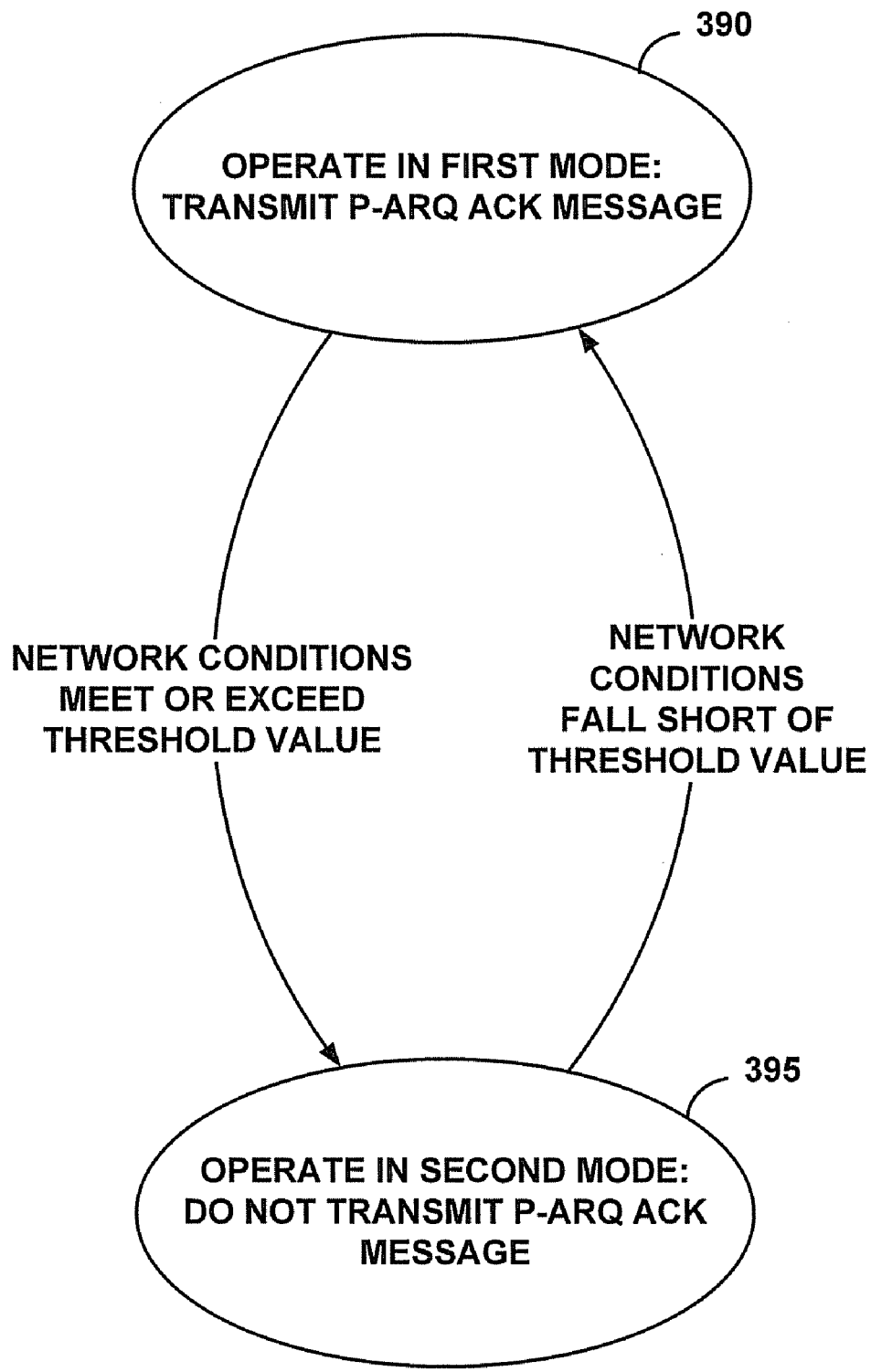

FIG. 3D depicts a state diagram illustrating the first and second modes of operation in more detail. In first mode 390, a P-ARQ ACK message is transmitted when a packet is successfully decoded. However, if measured network conditions are found to meet or exceed a threshold value, operation switches to second mode 395. In second mode 395, P-ARQ ACK messages are not transmitted when a packet is successfully decoded. When operation is switched from the first mode to the second mode or from the second mode to the first mode, an indication of the mode or an indication of the mode change may be transmitted to the client node. As discussed in the previous section, the access node may transmit an indication of the mode change using a new or existing control channel or control sub-channel between the access node and client node.

The methods illustrated by FIGS. 3A, 3B, 3C, and 3D may contain more or fewer steps, and these steps may occur in a different order than is depicted in these figures. Furthermore, these methods may be combined with one another, in whole or in part.

It should be understood that although the examples of hybrid ARQ operation contained herein refer to a client node transmitting subpackets to an access node, these methods and systems may used between any two types of network nodes. For instance, these hybrid ARQ improvements can be used when an access node transmits subpacket to a client node (in this case, for purposes of hybrid ARQ operation, the access node may be considered the client node and the client node may be considered the access node), or between any two peer nodes.

IV. Exemplary Access Node Embodiment

Figure 4:
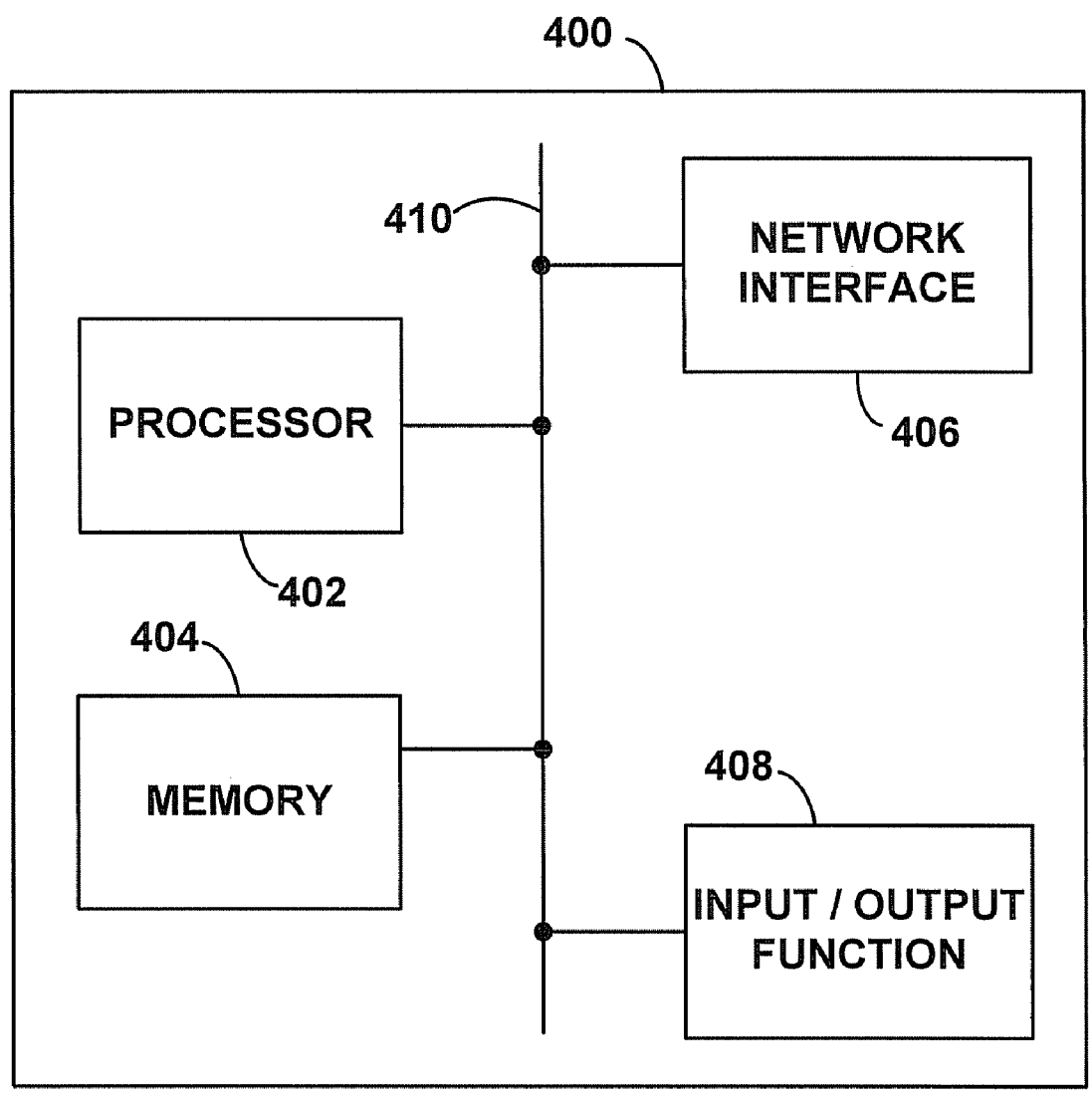
FIG. 4 depicts a block diagram of an access node in accordance with a preferred embodiment.

FIG. 4 is a simplified block diagram of an example access node 400, illustrating some of the functional components that would likely be found in an access node arranged to operate in accordance with the embodiments herein. Example access node 400 preferably includes a processor 402, a memory 404, a network interface 406, and an input/output function 408, all of which may be coupled by a system bus 410 or a similar mechanism.

Processor 402 preferably includes one or more CPUs, such as one or more general purpose processors and/or one or more dedicated processors (e.g., application specific integrated circuits (ASICs) or digital signal processors (DSPs), etc.) Memory 404, in turn, may comprise volatile and/or non-volatile memory and can be integrated in whole or in part with processor 402. Memory 404 preferably holds program instructions executable by processor 402, and data that is manipulated by these instructions, to carry out various logic functions described herein. Alternatively, the logic functions can be defined by hardware, firmware, and/or any combination of hardware, firmware and software.

Network interface 406 may take the form of a wireline connection, such as an Ethernet, Token Ring, SONET, or T-carrier connection. Network interface 406 may also take the form of a wireless connection, such as IEEE 802.11, BLUETOOTH®, CDMA, WIMAX®, UMTS®, LTE®, or any other interface used to communicate with client nodes. However, other forms of physical layer connections and other types of standard or proprietary communication protocols may be used over network interface 406. Furthermore, network interface 406 may comprise multiple physical or logical network interfaces, each capable of operating in according to the same or different protocols.

Input/output function 408 facilitates user interaction with example access node 400. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, example access node 400 may support remote access from another device, via network interface 406 or via another interface (not shown), such an RS-232 port.

By way of example, the data in memory 404 will preferably contain information associated with client nodes served by the access node. This information may include identifiers of the client nodes, such as the client nodes' medium access (MAC) layer addresses, Internet Protocol (IP) address(es), International Mobile Subscriber Identities, Electronic Serial Numbers, and so on. Memory 404 may also contain a threshold value representing a network condition.

Memory 404 may further comprise stored program instructions that are executable by processor 402 to receive a plurality of subpackets from the client node and to transmit a plurality of acknowledgment messages to a client node, wherein each acknowledgment message in the plurality of acknowledgment messages corresponds to a subpacket of the plurality of subpackets. Furthermore, memory 404 may also comprise stored program instructions that are executable by processor 402 to assemble the plurality of subpackets into a packet.

Additionally, memory 404 may also comprise stored program instructions that are executable by processor 402 to compare a value representing a measured network condition to a pre-defined threshold value, and to determine, based on the comparison, to pass the packet to a higher-layer protocol for further processing without transmitting an acknowledgement of the packet to the client node. If the network between the access node and client node is a wireless network, the measured network condition is preferably based on a quality of air interface of the wireless network.

Memory 404 is not limited to comprising the data and program instructions discussed in this section. Memory 404 may also comprise stored program instructions that are executable by processor 402 to perform any of the functions presented herein or represented by any of the accompanying figures.

V. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method at an access node, wherein the access node is communicatively coupled to a client node by a network, wherein the access node maintains a threshold value, and wherein the threshold value represents a network condition, the method comprising:
receiving a plurality of subpackets from the client node;
transmitting a plurality of negative subpacket acknowledgment messages to the client node, wherein each negative subpacket acknowledgment message in the plurality of negative subpacket acknowledgment messages negatively acknowledges a subpacket of the received plurality of subpackets;
after transmitting the plurality of negative subpacket acknowledgements, transmitting a positive subpacket acknowledgement message to the client node, wherein the positive subpacket acknowledgement message positively acknowledges a final subpacket of the received plurality of subpackets;
assembling the received plurality of subpackets into a packet;
comparing a value representing a measured network condition to the threshold value; and
determining, based on the comparison, whether to pass the packet to a higher-layer protocol for further processing without transmitting a packet acknowledgement message to the client node, wherein the packet acknowledgement message acknowledges receipt of the packet, and wherein the higher-layer protocol is selected from the group consisting of a data-link layer and a network layer.

2. The method of claim 1, wherein the measured network condition is measured by an element selected from the group consisting of the access node and the client node.

3. The method of claim 1, wherein the measured network condition is based on a sliding window of measurements of a quality of the network.

4. The method of claim 1, wherein the network is a wireless network comprising an air interface, wherein the client node is a wireless communication device communicatively coupled to the access node via the air interface, and wherein the measured network condition is based on a quality of the air interface.

5. The method of claim 4, wherein the quality of the air interface is a packet error rate of the air interface.

6. The method of claim 4, further comprising:
prior to receiving the received plurality of subpackets, the access node receiving a previous plurality of subpackets, wherein the measured network condition is based on a number of subpackets in the previous plurality.

7. The method of claim 6, wherein the number of subpackets in the previous plurality is determined from information received at the access node on a reverse rate indicator channel.

8. A method for adaptive hybrid automatic repeat request (H-ARQ) at an access node, wherein the access node is communicatively coupled to a client node by a network, wherein the access node maintains a threshold value, and wherein the threshold value represents a network condition, the method comprising:
receiving a plurality of subpackets from the client node;
transmitting a plurality of negative subpacket acknowledgement messages to the client node, wherein each negative subpacket acknowledgment message in the plurality of negative subpacket acknowledgment messages negatively acknowledges a subpacket of the received plurality of subpackets;
after transmitting the plurality of negative subpacket acknowledgements, transmitting a positive subpacket acknowledgement message to the client node, wherein the positive subpacket acknowledgement message positively acknowledges a final subpacket of the received plurality of subpackets;
assembling the received plurality of subpackets into a packet;
operating according to a first mode, wherein the first mode involves (1) transmitting, to the client node, a packet acknowledgement to acknowledge receipt of the packet, and (2) after transmitting the packet acknowledgment, passing the packet to a higher-layer protocol for further processing, wherein the higher-layer protocol is selected from the group consisting of a data-link layer and a network layer;
determining a first value that represents a first measured condition of the network;
comparing the first value to the threshold value; and
in response to the comparing, switching from the first mode to a second mode, wherein the second mode involves passing the packet to the higher-layer protocol for further processing without transmitting the packet acknowledgment.

9. The method of claim 8, further comprising:
determining a second value representing a second measured condition of the network;
comparing the second value to the threshold value; and
in response to the comparing, switching from the second mode to the first mode.

10. The method of claim 8, further comprising:
setting the threshold value to represent a different network condition.

11. The method of claim 8, further comprising:
upon switching from the first mode to the second mode, the access node transmitting an indication of the second mode to the client node.

12. The method of claim 8, wherein the first measured condition of the network is measured by an element selected from the group consisting of the access node and the client node.

13. The method of claim 8, wherein the first measured condition of the network is based on at least one measurement of a quality of the network.

14. The method of claim 8, wherein the first measured condition of the network is based on a sliding window of measurements of a quality of the network.

15. The method of claim 8, wherein network is a wireless network comprising an air interface, wherein the client node is a wireless communication device communicatively coupled to the access node via the air interface, and wherein the first measured condition of the network is based on a quality of the air interface.

16. The method of claim 15, wherein the quality of the air interface is a packet error rate of the air interface.

17. The method of claim 8, further comprising:
prior to receiving the received plurality of subpackets, the access node receiving a previous plurality of subpackets, wherein the measured network condition is based on a number of subpackets in the previous plurality.

18. The method of claim 17, wherein the number of subpackets in the previous plurality is determined from information received at the access node on a reverse rate indicator channel.

19. An access node communicatively coupled to a client node by a network, the access node comprising:
a processor;
a memory;
a threshold value, stored in the memory, that represents a network condition;
program instructions stored in the memory and executable by the processor to receive a plurality of subpackets from the client node;
program instructions stored in the memory and executable by the processor to transmit a plurality of negative subpacket acknowledgment messages to the client node, wherein each negative subpacket acknowledgment message in the plurality of negative subpacket acknowledgment messages negatively acknowledges a subpacket of the received plurality of subpackets;
program instructions stored in the memory and executable by the processor to, after transmitting the plurality of negative subpacket acknowledgements, transmit a positive subpacket acknowledgement message to the client node, wherein the positive subpacket acknowledgement message positively acknowledges a final subpacket of the received plurality of subpackets;
program instructions stored in the memory and executable by the processor to assemble the received plurality of subpackets into a packet;
program instructions stored in the memory and executable by the processor to compare a value representing a measured network condition to the threshold value; and
program instructions stored in the memory and executable by the processor to determine, based on the comparison, whether to pass the packet to a higher-layer protocol for further processing without transmitting a packet acknowledgement to the client node, wherein the packet acknowledgement acknowledges receipt of the packet, and wherein the higher-layer protocol is selected from the group consisting of a data-link layer and a network layer.

20. The method of claim 19, wherein network is a wireless network comprising an air interface, wherein the client node is a wireless communication device communicatively coupled to the access node via the air interface, and wherein the measured network condition is based on a quality of the air interface.

21. A method at an access node, wherein the access node is communicatively coupled to a client node by a network, wherein the access node maintains a threshold value, and wherein the threshold value represents a network condition, the method comprising:
receiving a plurality of subpackets from the client node;
transmitting a plurality of negative subpacket acknowledgment messages to the client node, wherein each negative subpacket acknowledgment message in the plurality of negative subpacket acknowledgment messages negatively acknowledges a subpacket of the received plurality of subpackets;
after transmitting the plurality of negative subpacket acknowledgements, transmitting a positive subpacket acknowledgement message to the client node, wherein the positive subpacket acknowledgement message positively acknowledges a final subpacket of the received plurality of subpackets;
assembling the received plurality of subpackets into a packet;
comparing a value representing a measured network condition to the threshold value;
if the measured network condition meets the threshold value, passing the packet to a higher-layer protocol for further processing without transmitting a packet acknowledgement message to the client node, wherein the packet acknowledgement acknowledges the packet, and wherein the higher-layer protocol is selected from the group consisting of a data-link layer and a network layer; and
if the measured network condition does not meet the threshold value, transmitting the packet acknowledgement message to the client node then passing the packet to the higher-layer protocol for further processing.

* * * * *